United States Patent [19]
Dent et al.

[11] 3,990,542

[45] *Nov. 9, 1976

[54] LINEAR MOTION ARRESTING DEVICE

[75] Inventors: Robert K. Dent, Seattle; Douglas K. DuBuque, Lynnwood, both of Wash.

[73] Assignee: Tyee Aircraft, Inc., Everett, Wash.

[ * ] Notice: The portion of the term of this patent subsequent to Apr. 20, 1993, has been disclaimed.

[22] Filed: Jan. 22, 1976

[21] Appl. No.: 651,609

Related U.S. Application Data

[63] Continuation-in-part of Ser. No. 533,285, Dec. 16, 1974, Pat. No. 3,951,238.

[52] U.S. Cl. .................................. 188/67; 16/82; 74/531; 188/1 B; 188/129
[51] Int. Cl.² .................................. B65H 59/10
[58] Field of Search ............. 188/1 B, 67, 129, 136; 16/49, 82; 74/531; 248/354 R

[56] References Cited
UNITED STATES PATENTS

| | | | |
|---|---|---|---|
| 1,103,839 | 7/1914 | Rellay | 74/531 X |
| 2,449,516 | 9/1948 | Shakespeare et al. | 74/531 X |
| 2,507,760 | 5/1950 | Dath | 188/129 |

FOREIGN PATENTS OR APPLICATIONS

| | | | |
|---|---|---|---|
| 1,122,015 | 5/1956 | France | 188/129 |

*Primary Examiner*—George E. A. Halvos

[57] ABSTRACT

The linear motion arresting device has a stationary member with an internal bore. A mating piston, formed of a plurality of piston parts, is slidable in said bore. One piston part is connected to a prime mover and the others are slidable toward and away from, and lengthwise of, said one piston part. Each of the piston parts has an elongated groove extending parallel to the bore and with the grooves providing directly between piston parts, a ball receiving channel in which a ball may travel and with the channel extending axially of, and at an angle to, the bore and with portions of the two opposite ends of the grooves extending more radially inwardly of the bore than the other two. A relatively nondeformable ball is mounted for travel in the ball receiving channel. A spring construction moves the piston parts in opposite, axial directions until the more radially inward portions of said grooves contact said ball. The driving piston part is connected with a prime mover and the driven piston parts are connected therewith through said ball. The spring construction include an axially aligned recess in one piston part, and an axially aligned compression spring in the recess and with the spring operating between piston parts. Two axially aligned, driven piston parts may be connected with a driving piston part to provide arresting action in both directions of travel of the piston.

5 Claims, 10 Drawing Figures

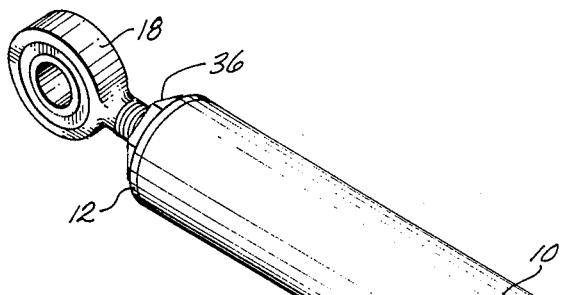
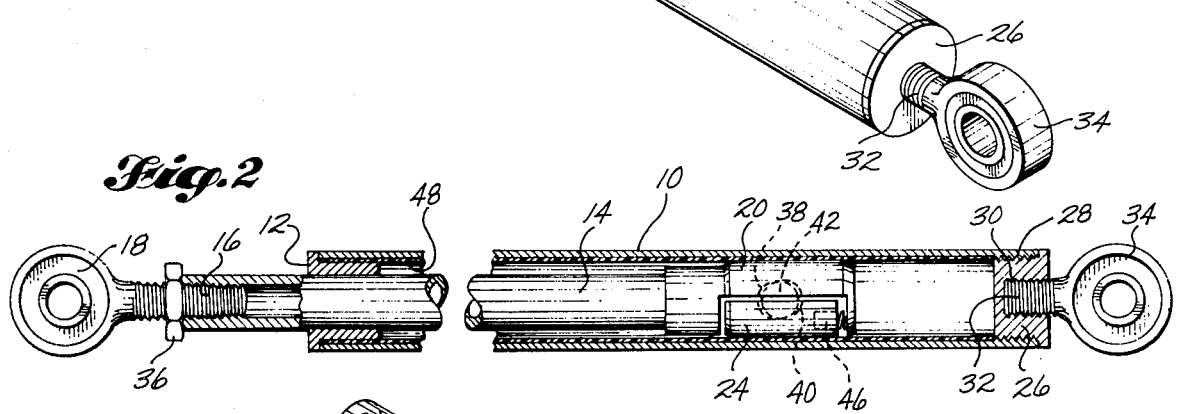
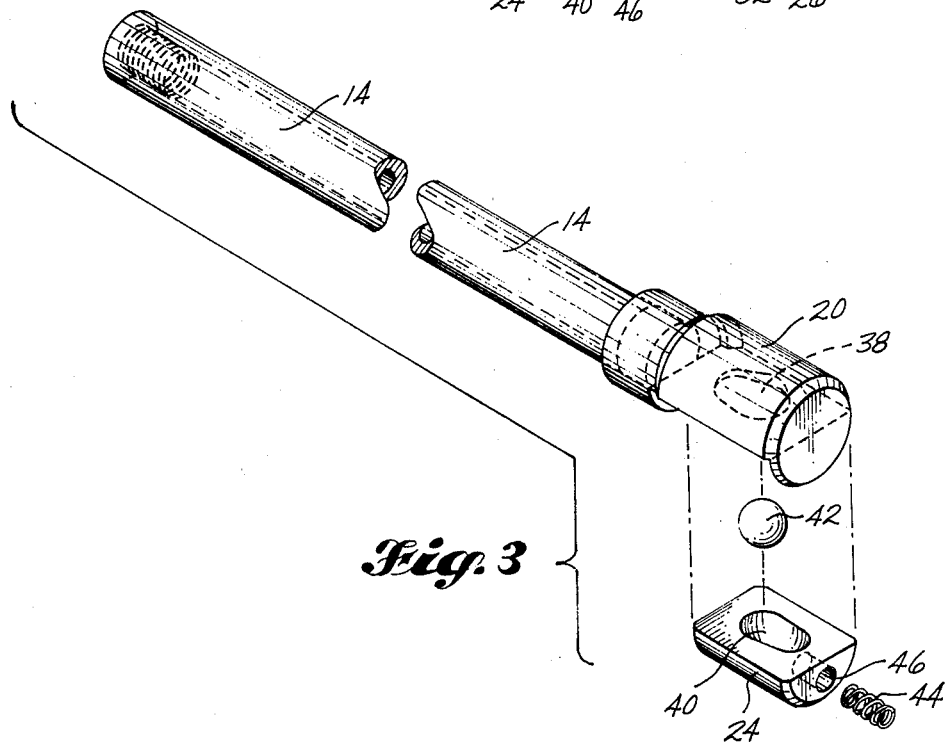

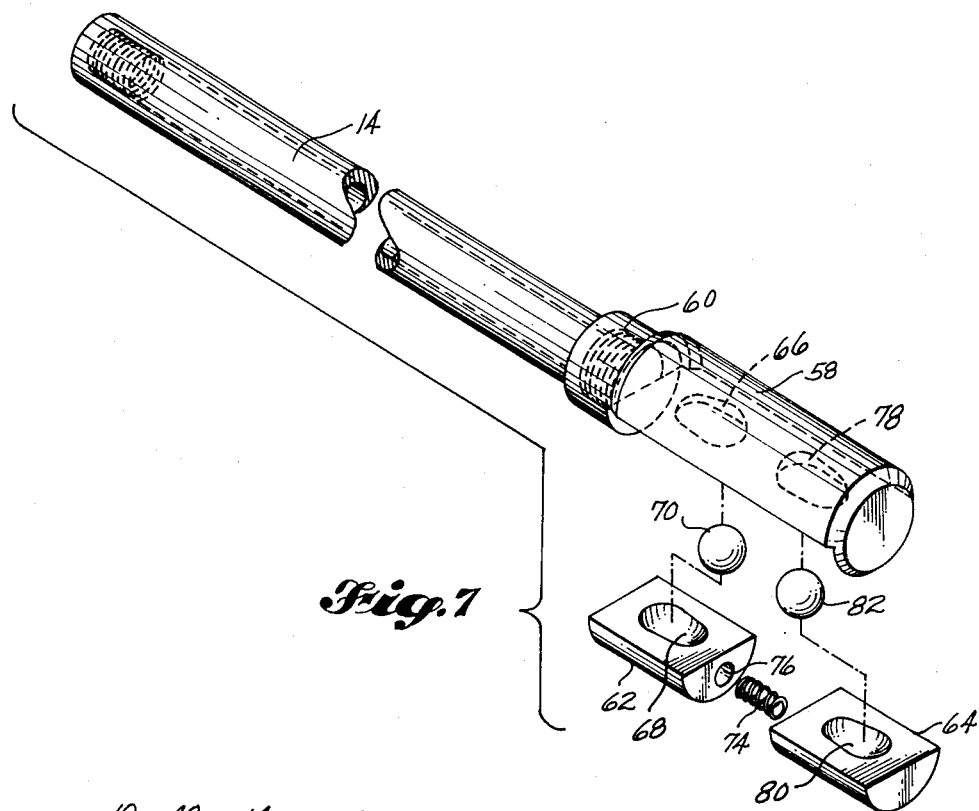
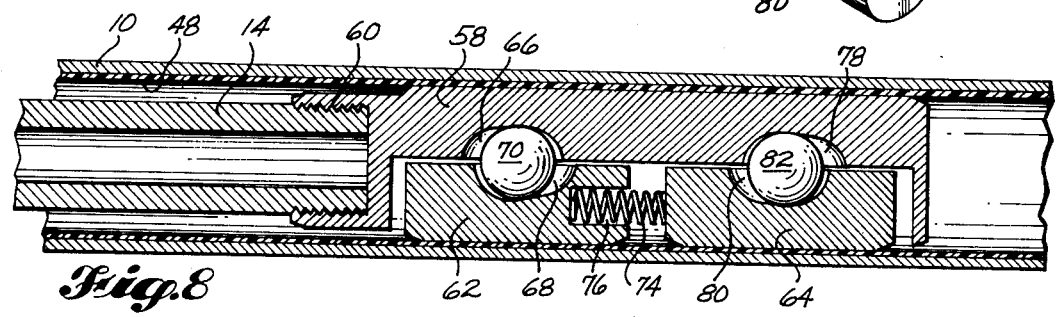
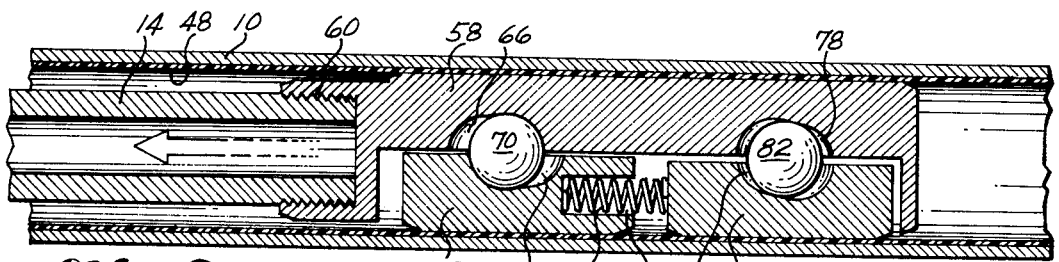
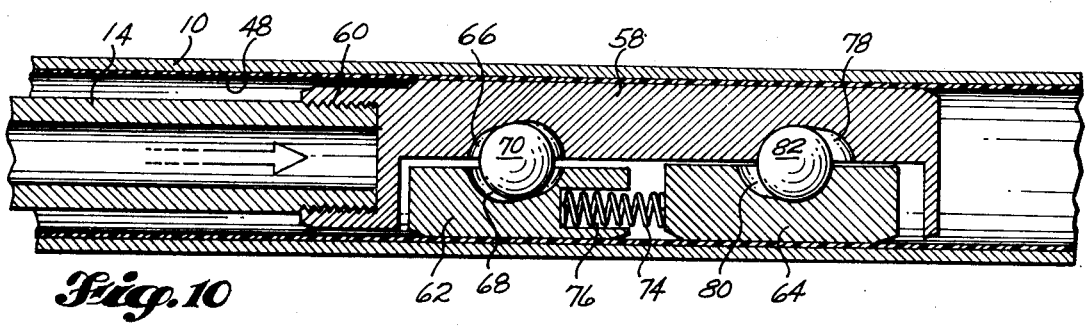

3,990,542

LINEAR MOTION ARRESTING DEVICE

CROSS REFERENCE TO RELATED APPLICATION

This application is a continuation-in-part of our co-pending application, Ser. No. 533,285, filed Dec. 16, 1974, now U.S. Pat. No. 3,951,238.

BACKGROUND OF THE INVENTION

In our said copending application, a piston part was connected to a prime mover and an end portion or portions of the remaining piston part or parts was or were urged crosswise or normal to the axis of the cylindrical bore by spring means. Thus, the piston parts did not slide relative to each other in a direction axially of the bore of the cylinder nor away from each other in a direction normal thereto until the driving piston part or the piston part connected to the prime mover had motion to some extent. This motion was thus lost motion so far as the application of any arresting force is concerned. In the present invention, the piston parts are always under the influence of resilient means urging them in opposite directions axially of the piston bore even when the prime mover is at rest. The said resilient means thus causes the piston parts and the relatively noncompressible ball to relatively travel so that the piston parts are always in contact relative to each other through the ball. This eliminates the false motion and the piston parts will, without delay or false motion, move in unison for arresting action in one direction of travel and move in nonarresting action in the opposite direction of travel. The action may be duplicated, so far as any arresting action is concerned, in both direction, when two axially aligned, driven piston parts and a ball for each is employed in accordance with the present invention.

The prior art patents known to applicants and which were cited in said parent application are:

| U.S. PAT. NO. | DATE | PATENTEE | CLASS | SUB-CLASS |
|---|---|---|---|---|
| 2,139,666 | 12-1938 | Bogart | 188 | 129X |
| 3,165,936 | 1-1965 | Daugherty | 74 | 527X |
| 3,796,288 | 3-1974 | Hollnagel | 188 | 129 |
| 3,866,724 | 2-1975 | Hollnagel | 188 | 1BX |

| PAT. NO. | DATE | COUNTRY | NAME | CLASS | SUB-CLASS |
|---|---|---|---|---|---|
| 598,485 | 6-1934 | Germany | Krupp | 188 | 129 |
| 734,266 | 7-1932 | France | Moreno | 188 | 129 |

SUMMARY OF THE INVENTION

A snubber or motion arresting device, having relative linear motion between a piston and a sleeve, having a cylindrical bore therein, is the subject matter of this invention. The motion arresting device comprises a mechanical brake or friction device between the sleeve and the piston. The piston comprises a plurality of piston parts, slidable relative to each other a plane parallel to the axis of the sleeve and movable toward and away from each other, said piston parts, each having an elongated groove extending generally parallel to the axis of the bore or sleeve and with the grooves providing, directly between piston parts, a ball receiving channel in which a ball may travel. The channel extends generally axially of, and at an angle to, the bore of said sleeve and with one end portion of each groove extending more radially inwardly of the direction of the bore than the other end portion. The ball is lodged for traveling movement in, and relative to said ball receiving channel. Resilient means urges the piston parts in opposite directions axially of said bore and the piston parts upon such movement, because of the nature of the ball receiving channel and said ball, causes the piston parts to move in opposite directions and through said ball moves the piston parts into contact with the sleeve bore while the prime mover is at rest and thus all false motion is eliminated.

When one ball receiving channel with a traveling ball therein is provided between driving and driven piston parts, arresting action is provided during one direction of travel of the piston parts and release action obtains during the opposite direction of travel. When two driven, axially aligned, piston parts are provided in combination with separate traveling balls and separate ball receiving channels, then arresting action is provided in both directions of piston travel.

Further objects and advantages of the present invention will become explicit and implicit as the description thereof proceeds in connection with the drawings.

DESCRIPTION OF THE DRAWINGS

A more complete understanding of the invention may be had by reference to the accompanying drawings illustrating preferred embodiments of the invention in which like reference characters refer to like parts throughout the several views and in which:

FIG. 1 is a perspective view of a device embodying this invention;

FIG. 2 is a longitudinal sectional view, with parts in elevation and parts broken away, of the structure of FIG. 1;

FIG. 3 is an exploded, perspective view showing internal moving parts of the structure of FIG. 1;

FIG. 7 is a view similar to FIG. 3 of the structure of FIG. 6;

FIG. 8 is an enlarged, fragmentary view of the parts shown in FIG. 6 and with the moving parts shown in a rest position;

FIG. 9 is a view similar to FIG. 8 and showing a position of the moving parts when a pull is exerted on the piston rod; and FIG. 10 is a view similar to FIG. 9 showing a position the moving parts assume when a thrust is exerted on the piston rod.

DESCRIPTION OF A PREFERRED EMBODIMENT

Figure 4:
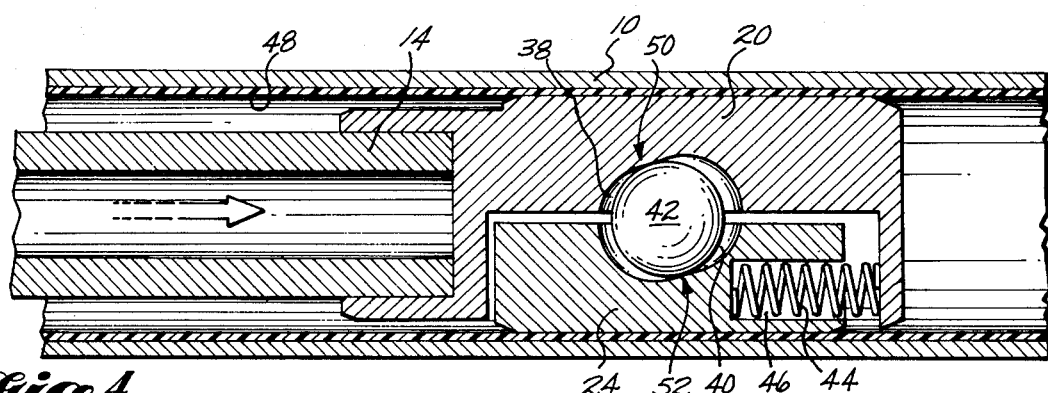
FIG. 4 is an enlarged, fragmentary view of parts shown in FIG. 2 and a structure designed to provide an arresting action when a thrust is exerted on the piston rod.
Figure 5:
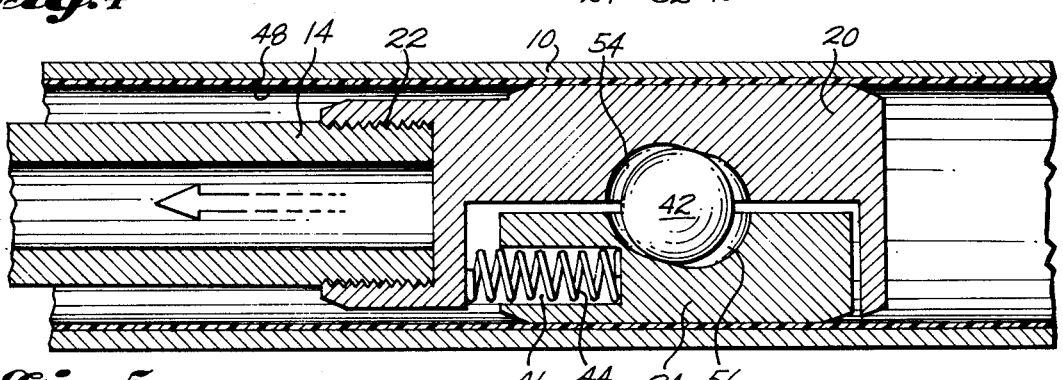
FIG. 5 is a view similar to FIG. 4 but with the parts designed to provide an arresting action when a pull is exerted on the piston rod.
Figure 6:
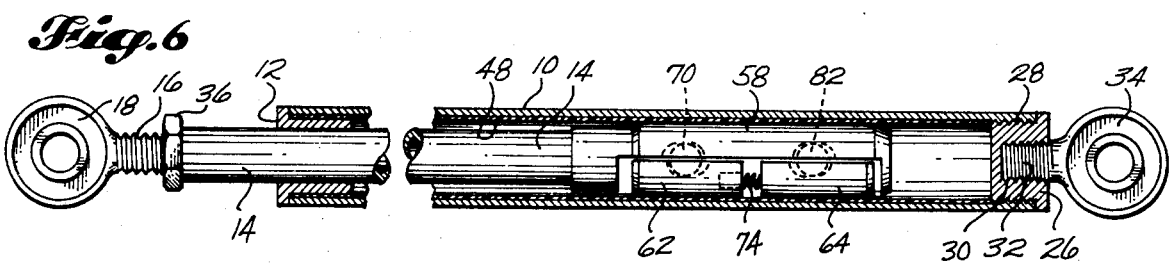
FIG. 6 is a view similar to FIG. 1 of a modified form of the invention designed to provide an arresting action when either a thrust or a pull is exerted on the piston rod.

Referring to the figures, and particularly to FIGS. 1 to 5, inclusive, a sleeve 10 is preferably of tubular form and is fabricated on any suitable material, as aluminum, steel, plastic, and the like. Sleeve guide 12 is connected by a threaded connection, or a press fit connection as shown, with sleeve 10. Piston rod 14 has one end portion thereof threaded to threadingly receive a threaded end portion 16 of an attachment fitting, illustrated by a rod end bearing 18. The piston rod 14 has a free sliding fit with piston sleeve guide 12. Piston rod 14 has its other end portion secured to driving piston part 20 by any suitable means. If a push force is exerted when the parts are under load, as in FIG. 4, then a press fit connection, as shown in said FIG. 4, is satisfactory. If a pull force is exerted when the parts are under load, as in FIG. 5, then the connection may be matching threads 22 carried by the piston rod 14 and the driving piston part 20. Thus, whether the device is loaded with a push force (as indicated by FIG. 4) or by a pull force (as indicated by FIG. 5), the connection between the piston rod 14 and the driving piston part 20 will be maintained.

In the form shown in FIGS. 1 to 5, inclusive, the piston is composed of two parts, namely, a driving piston part 20 and a driven piston part 24. The two piston parts 20 and 24, together form a piston, circular in cross-section and which has a free sliding fit with the longitudinal bore of the sleeve 10. However, the driven piston part 24 may be a plurality of parts as is indicated in said parent application of which this application is a continuation-in-part.

The other end portion of sleeve 10, preferably, has a threaded connection by threads 28 with end fitting 26 connected with threaded shaft 32 of rod end bearing 34. To maintain an overall desired length of the device between rod end bearings 18 and 34, lock nut 36 is threaded on shaft 16 to maintain an adjusted length obtained by rotation of the rod end bearing 18 relative to shaft 16.

Referring to FIGS. 2 and 4, a groove 38 is located in the driving piston part 20 and a groove 40 is located in the driven piston part 24. The groove 38 in the driving piston part 20 is at an incline to a horizontal plane parallel to the axis of the bore of the sleeve 10 and with the end portion closest to such axis is to the left as respects the showing in FIGS. 2 and 4. The groove 40 in the driven piston part 24 is also at an incline to a horizontal plane parallel to the axis of the bore of sleeve 10 and with the end portion closest to such axis to the right with respect to the showing in FIGS. 2 and 4. The grooves 38 and 40 form a ball receiving channel directly between piston parts 20 and 24 in which a ball may travel and with such channel extending generally axially of, and at an angle to, the bore of sleeve 10 and with opposite ends of the grooves 38 and 40, forming said channel, extending more radially inward of the direction of the bore than the other end portions of the grooves. Thus, when the driving piston part 20 relatively moves to the right as respects the showing of FIG. 4, the more radially inward portion of the groove 38 in the driving piston part 20 will engage the ball 42, which ball in turn will engage the more radially inward portion of the groove 40 in the driven piston part 24. Thus, the motion to the right of the driving piston part 20 is imparted to the driven piston part 24. The construction of FIG. 4 is designed to load the piston parts or provide a braking action when thrust is applied to the driving piston part 20. Movement in the opposite direction (or to the left of FIG. 4) of the driving piston part 20 causes the ball 42 and the more radially outward portions of the grooves 38 and 40 to move relatively toward each other and the ball releases engagement between the driving and driven piston parts 20 and 24. The ball 42 is formed of any material having suitable hardness and strength to resist deforming or compression, such as metal or suitable plastic, and as an example thereof is often referred to herein as a metallic ball.

An advantage of the present invention over that disclosed in my said parent application is the provision of a resilient member to urge driving piston part 20 and driven piston part 24 relatively in opposite directions. Thus, a rest position will be with the metallic ball 42 lightly contacting and with merely the pressure of a relatively light spring 44 and at opposite surfaces thereof, a portion of groove 38 of driving piston part 20 and a portion of groove 40 of driven piston part 24. The metallic ball 42 in so relatively traveling causes the piston parts 20 and 24 to move, crosswise of the sleeve 10, away from each other and to each contact the bore of sleeve 10. However, not enough pressure is provided by the relatively weak spring 44 to provide any braking action. When the parts are in such rest position and when a thrust is then applied on piston rod 14 (as in FIG. 4) and in turn on driving piston part 20, the driven piston part 24 has some resistance to sliding because of its frictional contact with the bore of sleeve 10. The frictional pressure between driven piston part 24 and the bore of sleeve 10 causes the metallic ball 42 to travel relatively in the channel (formed directly between piston parts 20 and 24 by the grooves 38 and 40) and the piston parts 20 and 24 engage the walls of the bore in sleeve 10 and provide a braking action which, in general, tends to have a uniform rate of travel and this despite the extent of thrust applied to the piston rod 14. When the thrust on piston rod 14 is terminated, the parts 20, 42, and 24 relatively move to rest position. Thereafter, if a pull is exerted on the piston rod 14, the metallic ball travels relative the groove 38 in driving piston part 20 and the groove 40 in driven piston part 24 and toward the position of the parts thereof furtherest away from the central longitudinal axis of the bore of sleeve 10 and no braking action exists between the piston parts 20 and 24 and the bore of sleeve 10.

The resilient force urging the piston parts 20 and 24 in opposite directions is illustrated by compression coil spring 44 disposed in a recess 46 in driven piston part 24 disposed to react between said driven piston part 24 and the driving piston part 20. Obviously, the recess 46 may be disposed in either the driven or the driving piston part and react against a suitably directed portion of the other thereof.

The spring 44 has a very light spring pressure and only sufficient to move piston parts 20 and 24 in opposite directions, and through the travel of the ball 42 in the channel provided between grooves 38 and 40, outwardly and into contact with the bore of sleeve 10. Thus, the ball 42 may travel in a channel disposed directly between a driving piston part 20 and a driven piston part 24 and in a channel provided by grooves in the piston parts and which grooves have end portions more radially inward of the bore of the sleeve than other end portions thereof.

The internal bore of the sleeve 10 is lined with a friction-reducing liner 48. This liner 48 may be a burnished Teflon liner as taught by my said parent application When the parts are in the position shown in FIG. 4 of the drawings and a thrust force is exerted on piston rod 14, the driving piston part 20 moves toward the right in said figure and the portion of the groove 38 in the driving piston part 20, indicated by the arrow 50, will exert a thrust against the surface of ball 42. In turn, the ball 42 will move and engage, at an opposite area, the portion of the groove 40 in the driven piston part 24, indicated by the arrow 52. The external surfaces of the piston parts 20 and 24 are in contact with the bore of the liner 48 by reason of the action of the spring 44. The amount of frictional engagement of the driven piston part 24 with the bore of the lining 48 depends upon the thrust on piston rod 14 and the angle of the incline of grooves 38 and 40 to a longitudinal axis of the bore of the liner 48. The extent of this angle will depend upon many factors, such as the diameter of the piston 20, 24, the length of the piston wall surface, the smoothness of the bore of the liner 48, and other factors. Thus, in general, the operable range of such angle, I now find may be 8° to 20° and the preferred range is 11° to 16°.

When the thrust is released or a neutral position is reached, the parts will remain in contact, as shown, because of the action of spring 44 but there will be little, if any, thrust between the driving piston part 20, the ball 42, and the driven piston part 24.

When a pull is exerted on the piston rod 14, the driven piston part 24 will move lengthwise of the driving piston part 20, ball 42 will travel, and both piston parts 20 and 24 will move free of the surface of the bore 48 until only such contact remains as is necessary to balance the action of the relatively light spring 44.

Now referring to FIG. 5, the direction of the angle of grooves 54 and 56 in the driving and driven piston parts 20 and 24, relative to the axis of the bore of the liner 48 has been reversed as respects grooves 38 and 40 in FIGS. 2 and 4. This allows a pull on the piston rod 14 to relatively move the piston parts 20 and 24 apart and allow them to return to nonbraking action when the pull is ceased or a thrust is applied. Thus, the action resulting from a thrust or a pull in connection with the structure shown in FIG. 5 will be just the reverse of that described in connection with the structure of FIG. 4— all of which will be obvious without repetition of the description.

In general, the structure of FIGS. 6–10, inclusive, is designed to provide a braking action and this whether the driving piston part is either subject to a thrust or to a pull. In such figures, like parts of those of FIGS. 1 to 5 are given like numbers and the description of such parts is incorporated, therefore, by reference. Thus, we have in FIGS. 6–10, inclusive: sleeve 10, sleeve guide 12, piston rod 14, shaft 16, rod end bearing 18, lock nut 36, matching threads 22, end fitting 26, internal threads 30, threaded shaft 32, rod end bearing 34, and friction reducing liner 48.

The differences in FIGS. 6 to 10 over the previous figures is that driving piston part 58 supplants driving piston part 20 and driven piston parts 62 and 64 supplant driven piston part 24.

In FIGS. 7 and 8, driving piston part 58 is shown connected by a threaded connection 60 with piston rod 14 to secure the parts together, whether a thrust or a pull is exerted on piston rod 14. First driven piston part 62 and second driven piston part 64 are longitudinally aligned in the bore of liner 48 in sleeve 10 and the driving piston part 58 and driven piston parts 62 and 64 form a piston slidably fitted to the liner 48 of said sleeve 10. The groove 66 in the driving piston part 58, the groove 68 in the first driven piston part 62, and ball 70 are the counterparts of the groove 38, groove 40, and ball 42 of FIGS. 2 and 4 of the drawings.

The compression spring 74 is mounted in a recess 76 in one of the driven piston parts 62 or 64 and functions to move the said driven piston parts 62 and 64 in opposite directions and axially away from each other. The groove 78 in the driving piston part 58, the groove 80 in the second driven piston part 64, and the ball 82 are the counterparts of the grooves 54 in the driving piston part 20, groove 56 in the driven piston part 24, and the ball 42 of FIG. 5 of the drawings.

The grooves 66 in the driving piston 58 and the grooves 68 in the first driven piston part 62 have the same angle to the axial bore of the liner 48 in sleeve 10 as the grooves 38 and 40 in the driving and driven piston parts 20 and 24 of FIG. 4. Thus, movement to the right, as respects FIG. 10, or a thrust on the driving piston 58 will cause the piston parts 58 and 62 to move radially from each other (through the action of ball 70 in grooves 66 and 68) and apply a braking action between piston parts 58, 62 and the bore of liner 48 of sleeve 10.

In FIG. 4, with a release of the thrust on the driving piston part 20, the ball 42 relatively travels in grooves 38 and 40 and the driving piston 20 and the driven piston 24 move radially toward each other and the braking action between the piston parts 20, 24 ceases or a neutral position is reached. Similarly, in FIGS. 8 to 10, inclusive, and particularly in connection with FIG. 8, a similar position is reached as to driving piston 58, first driven piston part 62, grooves 66 and 68 in driving and driven piston parts 58 and 62 and ball 70 in said grooves.

The groove 78 in driving piston 58 and the groove 80 in the second driven piston part 64 have the same angles to the axis of the bore of liner 48 in sleeve 10 as the grooves 54 and 56 in driving and driven piston parts 20 and 24 of FIG. 5 of the drawings. Thus, movement to the left, as respects FIG. 8 of the drawings or a pull on driving piston part 58 as illustrated in FIG. 9 of the drawings will cause the piston parts 58 and 64 to move radially of each other (through the action of ball 82 in grooves 78 and 80 and apply a braking action between the piston parts 58 and 64 and the bore of the liner 48 of sleeve 10.

In FIG. 5, and with a release of the pull on the driving piston part 20, the ball 42 relatively travels in the grooves 54 and 56 and the driving piston 20 and the driven piston part 24 move radially toward each other and the braking action between the piston parts 20 and 24 ceases or a neutral position is reached. Similarly, in FIGS. 8 and 9, inclusive, and particularly in FIG. 8, a similar position is reached as to driving piston 58, first driven piston part 62, second driven piston part 64, grooves 66 and 68 in 58 and 62, grooves 78 and 80 in 58 and 64 because of the similarity of the angles of the grooves 78 and 80 of FIGS. 8 to 10 to the angles of the grooves 54 and 56 in driving and driven piston parts 20 and 24 of FIG. 5.

Thus, when a thrust is applied to the driving piston part 58 of FIG. 10, a braking action is applied by the driving piston 58 and the first driven piston part 62 as illustrated in FIG. 10 of the drawings which is similar to the action occuring in FIG. 4 of the drawings. When a pull is exerted on the driving piston part 58 of FIG. 9 of the drawings, a braking action is applied between the driving piston part 58 and the second driven piston part 64 of FIG. 9 of the drawings similar to the braking action which is applied when a pull is exerted on the driving piston part 20 of FIG. 5 and the driven piston part 24 of FIG. 5, as respects the liner 48 of the sleeve 10. When neither thrust nor pull is exerted on the driven piston part 58 of FIGS. 8 to 10, inclusive, we have the neutral position illustrated in FIG. 8 of the drawings and no braking action is applied.

In the structure illustrated in FIGS. 8 to 10 of the drawings, the driven piston parts are illustrated by a pair of two axially aligned driven piston parts 62 and 64 which are urged axially of the bore of the liner 48 of the sleeve 10 and in opposite directions by the coil spring 74. Similar to the structure of my said parent application, the driven piston parts herein may constitute more than one pair of axially aligned driven piston parts and which members of each pair are resiliently urged in opposite directions by a spring such as spring 74.

An environment of the use of the structures of FIGS. 1 to 5 hereof may be that as illustrated in my said parent application of passenger luggage bins for use on aircraft. An environment of the use of the structure of FIGS. 6 to 10 herein may be that of a shimmy damper on the nose gear of aircraft, or other environs where a braking action is desired whether a push or pull is exerted on a member connected with the driving piston rod and driving piston.

SUMMARY

In the foregoing, a linear motion arresting or snubber device applying mechanical braking is illustrated and described. The device may apply such braking action only in response to a thrust as illustrated in FIG. 4, or only in response to a pull as illustrated in FIG. 5, or in response to both thrust and pull as illustrated in connection with FIGS. 6 to 10, inclusive.

The sleeve 10 is preferably provided with a liner 48 and a piston comprising a driven piston part as 20 of FIGS. 1 to 5, inclusive, or 58 of FIGS. 6 to 10, inclusive. The driven piston parts, as 24 of FIGS. 1 to 5, inclusive, or axially aligned, as driven piston parts 62 and 64 of FIGS. 6 to 10, inclusive, are urged in opposite axial directions of the bore of sleeve liner 48 by resilient means as spring 44 of FIGS. 1 to 5, inclusive, and spring 74 of FIGS. 6 to 10, inclusive. Through the action of traveling ball 42 of FIGS. 1 to 5, inclusive, in either the grooves 38, 40 of FIG. 4 or 54, 56 of FIG. 5, the driving and driven piston parts 20, 24, move in an axial direction of the bore of the liner 48 of sleeve 10 and radially of each other to provide braking action between the piston parts and the bore of the liner 48 of sleeve 10. Through the action of the traveling ball 70 in the grooves 66, 68 and the traveling ball 82 in the grooves 78, 80 in FIGS. 6 to 10, inclusive, braking action is applied during push and pull actions, respectively, between a piston, comprising driving and driven piston parts, as one member and the bore 49 of the liner of sleeve 10 as the other braking member.

Whether the force for the driving piston 20 is a thrust force, as illustrated in FIG. 4, or is a tension or pull force, as illustrated in connection with FIG. 5, the ball groove 38 or 54 in the driving piston 20 will have its deeper groove portion toward its advancing end portion and have its shallower portion toward the trailing end portion of the piston. Also, the end portions of the groove in the driven piston will mate those in the opposite end portions of the driving piston, in other words, the deeper groove portion in the driven piston portion will be toward its trailing end portion. A driving piston and driven piston combination for reacting to a thrust is illustrated in FIG. 4, a driving piston and driven piston combination for reacting to a pull is illustrated in FIG. 5, and a driving piston combination and two axially aligned driven piston parts for reacting to a thrust or a pull are shown in FIGS. 6 to 10 of the drawings.

Additional summary advantages of this invention are set forth in said parent application and are not here repeated in interest of brevity.

Obviously, changes may be made in the forms, dimensions, and arrangements of the parts of this invention without departing from the principle thereof, the foregoing setting forth only preferred forms of embodiment of this invention.

We claim:

1. A linear motion arresting device comprising a relatively stationary sleeve having an internal bore; a piston slidably mounted in and mating said bore, said piston being formed of a plurality of piston parts, slidable relative to each other along a plane parallel to the axis of said bore and movable radially toward and away from each other, said piston parts, each having an elongated groove extending generally parallel to the axis of said bore and with said grooves providing, directly between piston parts, a ball receiving channel in which a ball may travel and with the channel extending generally axially of, and at an angle to, the bore and with one end of each groove extending more radially inwardly of the direction of the bore than the other end portion; a ball mounted for traveling movement in, and relatively to, said ball receiving channel; resilient means urging said piston parts in opposite directions axially of said bore and moving said piston parts radially relative to each other by reason of said ball and said ball receiving channel; and prime mover means connected to one of said piston parts and connected only through said ball to the other piston part, said prime mover moving the said piston part, and also another piston part, through said ball, longitudinally of said bore and radially of each other.

2. The combination of claim 1, wherein one of said piston parts is provided with a recess extending in a direction axially of said internal bore, and a compression spring is mounted in said recess and reacts between said one piston part and another piston part and urges said piston parts in opposite directions and through said ball away from each other.

3. The combination of claim 2, wherein said other piston part is provided with a projecting portion extending normal to the axis of said bore and the compression spring reacts between said projecting portion and the one piston part having said recess therein.

4. The combination of claim 1, wherein opposite end portions of the grooves in the piston parts are more radially inward in the direction of the bore than the other end portions of the grooves.

5. The combination of claim 1, wherein said other piston part comprises a plurality of piston parts longitudinally aligned in the axial direction of the bore and each of said other piston parts is connected with said one piston part through a separate ball.

* * * * *